Dec. 29, 1925.

J. T. L. LAVAGETTO

PLANT PROTECTOR

Filed April 30, 1923

1,567,740

WITNESS
C. O'Donovan

INVENTOR
J. T. L. Lavagetto.
BY
C. B. Goldberg.
ATTORNEYS

Patented Dec. 29, 1925.

1,567,740

UNITED STATES PATENT OFFICE.

JOSEPH T. L. LAVAGETTO, OF PORTLAND, OREGON.

PLANT PROTECTOR.

Application filed April 30, 1923. Serial No. 635,783.

*To all whom it may concern:*

Be it known that I, JOSEPH T. L. LAVAGETTO, a citizen of the United States, residing at Portland, in the county of Multnomah and State of Oregon, have invented a new and useful Plant Protector, of which the following is a specification.

My invention relates to improvements in plant protectors in which a vertically extending standard is firmly affixed to a horizontally extending top such as a disk.

The objects of my invention are to produce a device which is easily manufactured, which is very simple to apply, and which furnishes a protective roof over young and tender plants, especially against hail storms, destructive rains, burning sun, and to a certain extent against frost. The sides of the plant are left exposed to light and air so that the growth of the plant is in no wise retarded.

Other objects and advantages are to be found in the construction and arrangement of parts as will be described in the specification and particularly pointed out in the appended claim.

I attain these objects with the mechanism illustrated in the accompanying drawing, in which—

Similar numerals refer to similar parts throughout the several views.

Figure 1:
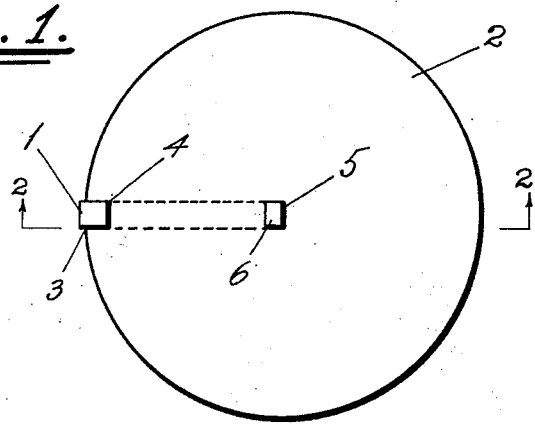
Fig. 1 is a plan view of a preferred form of construction.
Figure 2:
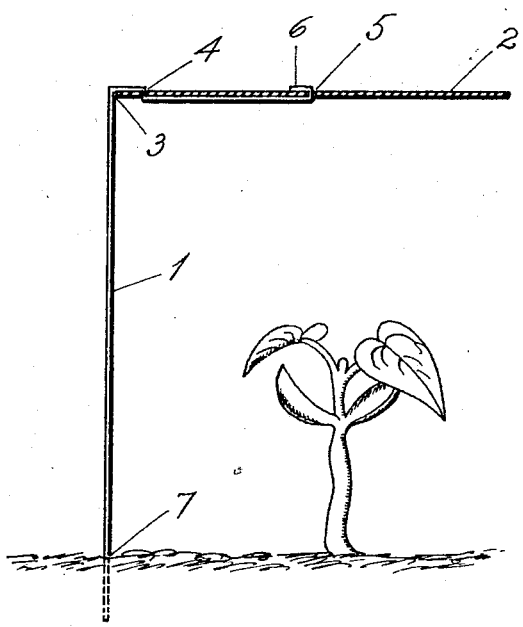
Fig. 2 is a section through Fig. 1 along the line 2—2.
Figure 3:
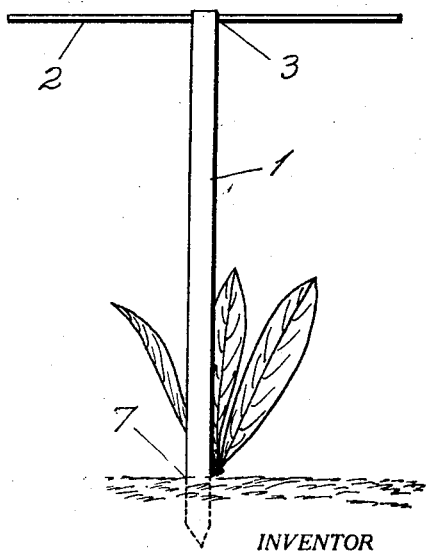
Fig. 3 is an end elevation of my device.

To the standard 1, which may be square or rectangular, is attached a top 2. The connection between standard and top may be made in any suitable manner. A preferred form of construction is illustrated in Figs. 1 to 3, where the top is provided with two apertures, one of them near the center, the other near the periphery. The standard is bent over the edge of the top as at 3, passes downwardly through the nearest aperture as at 4, then toward the center, then upwardly through the aperture near the center as at 5, and is finally bent upon itself toward the periphery as at 6. This forms a very simple yet substantial connection. The standard is inserted in the ground as at 7. After the plants have become hardy enough to withstand safely the inclemencies of the weather, the plant protector can be removed and stored away for another season. The top may be made of any suitable material.

Having thus described my invention, it will be seen that my objects have been accomplished and, though I have shown the preferred form of construction, I reserve to myself the right to make minor changes providing I do not contravene the spirit and principle of my invention.

I claim:

A plant protector, comprising an imperforate top having one aperture near the periphery and a second aperture at the center, with a standard therefor comprising a vertical portion pointed at the bottom and adapted to be pressed into the ground, and a horizontal portion extending toward one side from the top of the vertical portion, said horizontal portion beginning at the edge of the imperforate top nearest to the first-named aperture and proceeding in contact with the upper surface of said imperforate top toward said first-named aperture, thence proceeding downwardly through said first-named aperture and in contact with the lower surface of said imperforate top toward the second-named aperture, then proceeding upwardly through said second-named aperture, and bending back in clamping contact with the upper surface of the imperforate top for a short distance toward the starting point, substantially as and for the purpose set forth.

Signed by me at Portland, Oregon, this 23rd day of April, 1923.

JOSEPH T. L. LAVAGETTO.